United States Patent

Slezinger et al.

[11] 4,010,632
[45] Mar. 8, 1977

[54] PIEZOOPTICAL MEASURING TRANSDUCER

[76] Inventors: Isaak Isaevich Slezinger, ulitsa Kirova, 40-a, kv. 41; Georgy Mironovich Belitsky, Pervomaiskaya ulitsa 74, kv. 101; Vladimir Alexandrovich Shiryaev, ulitsa Iskra 7, kv. 34; Jury Vasilievich Mironov, Nagornaya ulitsa, 68 kor. 14, kv. 34, all of Moscow, U.S.S.R.

[22] Filed: Feb. 3, 1976

[21] Appl. No.: 654,733

[30] Foreign Application Priority Data

Feb. 12, 1975 U.S.S.R. .......................... 2105757

[52] U.S. Cl. .......................... 73/141 A; 73/88 A
[51] Int. Cl.² .......................... G01L 1/24
[58] Field of Search ........ 73/88 A, 141 A, DIG 11; 356/33

[56] References Cited

UNITED STATES PATENTS

| | | | |
|---|---|---|---|
| 3,039,298 | 6/1962 | Zandman | 73/88 A |
| 3,950,987 | 4/1976 | Slezinger et al. | 73/141 A |

*Primary Examiner*—Donald O. Woodiel
*Assistant Examiner*—Charles Gorenstein

[57] ABSTRACT

A piezooptical measuring transducer comprises two light sources connected to a square-pulse generator so that the luminous fluxes of each light source pass alternately through a polarizer common for both fluxes, phase-shifting plates individual for each flux, an elastic element common for both fluxes, sensitive to variations of mechanical stresses therein caused by changes in the measurand, an analyzer common for both fluxes, all placed in that order downstream of the light sources across the fluxes, the latter being alternately incident upon a photocell. The phase-shifting plates are oriented so that their axes of maximum velocity of light propagation are perpendicular to each other.

3 Claims, 18 Drawing Figures

PIEZOOPTICAL MEASURING TRANSDUCER

The present invention relates to primary measuring transducers of mechanical quantities into electrical signals and, in particular, to piezooptical measuring transducers.

There are known a great variety of primary measuring transducers extensively used in experimental technology, such as strain-gauge, inductive, capacitive, magneto elastic and piezoelectrical transducers.

Strain-gauge, inductive, capacitive and magnetoelastic transducers are parametric transducers, wherein strains in the elastic element cause variations in respective parameters. Thus, a strain-gauge transducer is characterized by variations in the electric resistance of a strain gauge (wire, foil or semiconductor) rigidly secured to an elastic element. Inductive and capacitive transducers are dependent on such parameters as inductance and capacity determined by the size of a gap in the magnetic circuit of the inductance coil, in the first instance, and between the plates of the measuring capacitor, in the second instance. The principle of operation of magnetoelastic transducers is based upon the interdependance of permeability of ferromagnetic materials and their mechanical stresses.

Piezoelectric transducers are essentially generators and, consequently, the output signal of such transducers is obtained as a result of the difference of potentials upon the sensitive element caused by its strain and not as a result of variations in a parameter.

The basic characteristics of primary transducers are the conversion ratio of a mechanical quantity into an electric signal (sensitivity) and the range of measurands, that is the frequency range, wherein guaranteed accuracy of measurements can be obtained with the help of such a transducer. This frequency range is directly dependent upon the natural (resonance) frequency of the transducer, which in turn, depends upon the rigidity of the transducers sensitive element. That is why the frequency range can only be widened by adding rigidity to the sensitive element of such a transducer. However, increased rigidity of the sensitive element results in a lower conversion ratio (sensitivity) of measuring transducers.

Any improvement of the basic characteristics of a transducer leads, therefore, to contradictory requirements, if its principle of operation remains unaltered. On the one hand, the rigidity of the sensitive element is to be increased to widen the frequency range, on the other hand, the rigidity is to be decreased to raise the conversion ratio (sensitivity).

A dimensionless sensitivity index (S) is convenient to use for comparison of parametric primary measuring transducers, just as it is customary for strain-gauge transducers. Such an index is defined as the ratio of relative variation of the output parameter to the elastic element strain. The dimensionless sensitivity index gives, therefore, an idea of the principle characteristics of measuring transducers, their conversion ratio (sensitivity) and the rigidity of their sensitive elements. The higher the dimensionless sensitivity index of a transducer, the better its basic characteristics.

Such widely used transducers as strain-gauge transducers feature a rather low index (S ≈ 2 for wire and S ≈ 150–200 for semiconductor strain-gauge transducers). Inductive and capacitive transducers possess S-indexes of much the same order as semiconductor strain-gauges A device with a wide frequency range and a high sensitivity is, therefore, difficult to provide on the basis of such transducers.

The S-index of magnetoelastic measuring transducers runs into the thousands, but the necessity to apply large mechanical stresses thereto limits the field of their use.

Piezoelectric transducers possess high sensitivity and rigidity, but the non-uniformity of its amplitude-frequency response curve in the low-frequency band makes them inconvenient to operate, since such transducers are to be dynamically calibrated.

Piezooptical measuring transducers are free of many of the forementioned shortcomings. Operation of such transducers is based upon the piezooptical effect, consisting in that the velocity of light in a solid transparent body (elastic element) is a function of the mechanical stress in the body and the orientation of the electric vector of electromagnetic wave in reference to the principal stresses characterizing this state of tension.

The dimensionless sensitivity S-index of such transducers may be as great as several tens or even hundreds of thousands depending upon the material of the elastic element. Various devices with a frequency range from zero to several tens and even thousands hertz may therefore, be, provided on the basis of such transducers, their output signal reaching several volts. Besides, piezooptical transducers feature of wide dynamic range (several thousands) owing to the low level of the basic noise.

At present, there are known several piezooptical measuring transducers.

The luminous flux from the light source in such transducers passes through a polarizer, an elastic element sensitive to variations of mechanical stresses therein, caused by changes in the measurand, a phase-shifting plate, an analyzer, all these elements being placed in series, and is incident upon a photocell converting this flux into an electric signal delivered to a recorder, its readings being representative of the measurand.

Such transducers are DC operated and this results in a high noise level as well as time and temperature zero drift and instability of the sensitivity index, caused by instability of the light source and photocell.

It is an object of this ivention to provide a piezooptical measuring transducer having a wide dynamic range.

Another object of the present invention is to provide a piezooptical measuring transducer with a small temperature and time zero drift.

Still another object of the invention is to provide a piezooptical measuring transducer with a stable conversion ratio (sensitivity index).

These objects are achieved by that a piezooptical measuring transducer, wherein the luminous flux from a light source passes through a polarizer, an elastic element sensitive to variations of mechanical stresses therein, caused by changes of a measurand, an analyzer and a phase-shifting plate between the polarizer and the analyzer, all arranged in that order downstream of the light source across the flux, and is incident upon photocell converting the light falling thereupon into an electric signal fed to a recorder, its readings being representative of the measurand, comprises, in accordance with the invention, an additional light source disposed in front of the polarizer so that its luminous flux passes through said polarizer, and an additional phase-shifting plate, disposed between the polarizer and the analyzer so that the luminous flux from the additional light source passes, after the polarizer through said phaseshifting plate, elastic element and analyzer and is incident upon the photocell, as well as a square-pulse generator, its outputs being electrically coupled to the main and additional light source so that the luminous fluxes of the main and additional light sources are alternately incident upon the photocell, the additional phase-shifting plate being oriented so that the axis of maximum velocity of light propagation is perpendicular to that of the main phase-shifting plate.

To minimize the temperature and time zero drift, it is expedient that the piezooptical measuring transducer be provided with a reference photocell disposed in the field of the luminous fluxes from the main and additional light sources, and a phase-sensitive amplifier, its inputs being coupled respectively to the reference photocell and square-pulse generator, as well as two individual current regulators for each light source, their inputs being connected to the output of the phase-sensitive amplifier, the square-pulse generator being coupled to each light source through an individual current regulator.

To minimize the temperature and time instability of the sensitivity index, it is expedient that the piezooptical measuring transducer be provided with a low-frequency filter, connnected to the first photocell, and a common current regulator for both light sources, its input being coupled to the low-frequency filter and the output being coupled to the input of the square-pulse generator.

The output signal of the proposed piezooptical measuring transducer being alternating current, the level of the transducer noise is reduced expanding, in turn, the dynamic range. The transducer being provided with a negative AC feedback circuit, its time and temperature zero stability is considerably, enhanced whereas the negative DC feedback circuit helps to stabilize the sensitivity index.

The invention will now be described in greater detail with reference to a specific embodiment thereof, taken in conjunction with the accompanying drawings, wherein:

FIG. I is a functional diagram of a piezooptical measuring transducer in accordance with the invention;

FIGS. 7 a, b are time charts of operation of the transducer of FIG. I;

FIGS. 8 a, b, c, d, e, f, g, h, i, j, are time charts of operation of the transducer of FIG. 4.

Figure 1:
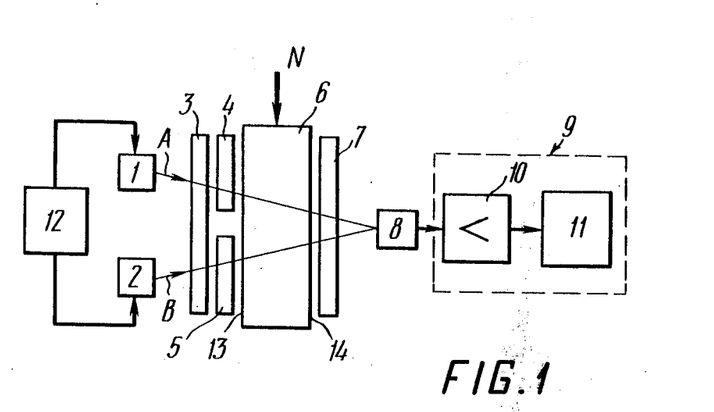

A piezooptical measuring transducer comprises, in accordance with the invention, two light sources I and 2 (FIG. I), their luminous fluxes passing through a polarizer 3, phaseshifting plates 4 and 5 individual for each flux, an elastic element 6 common for both fluxes and sensitive to variations of internal stresses caused by changes in the measured converted into a force N, and an analyzer 7 common for both fluxes, all placed in that order downstream of the light sources a cross the luminous fluxes, the latter being incident upon a photocell 8 converting the light falling thereupon into an electric signal fed to a recorder 9. The recorder 9 actuates a phase-sensitive amplifier 10 and a recording instrument II.

The proposed piezooptical measuring transducer also comprises a square-pulse generator 12, its outputs being connected to the light sources I and 2 so that the luminous fluxes A and B are incident alternately upon the photocell 8.

The elastic element 6 (FIG. 2) has the shape of an orthogonal prism with transparent faces 13 and 14, said luminous fluxes A and B from the light sources I and 2 passing therethrough, and is mounted upon a fixed support 15.

Figure 2:
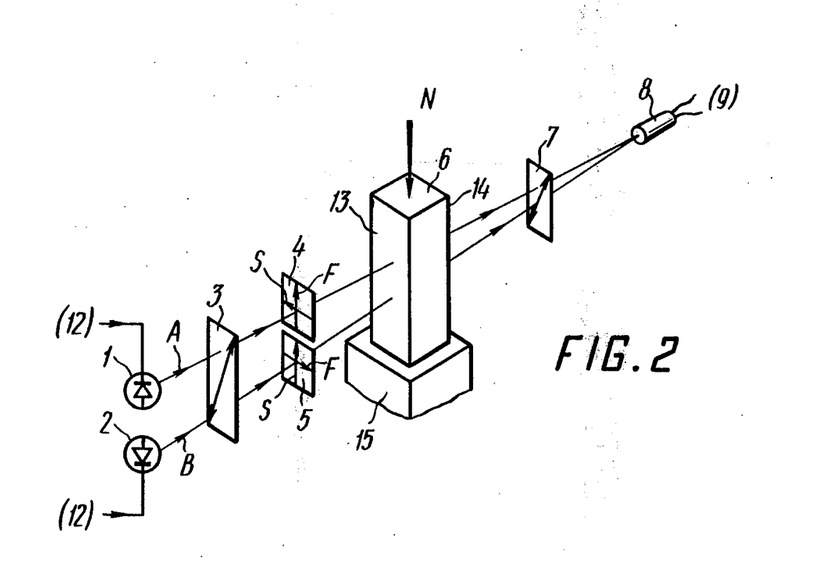
FIG. 2 is an optical circuit diagram of the transducer of FIG. 1.

The elastic element 6 is made of a hard transparent material, such as silicate glass, for example. It is also possible to use some singlecrystals having a substantially higher piezooptical effect and modulus of elasticity, to raise the sensitivity and natural frequency of the transducer.

Any emitters may be employed as the light sources I and 2. A semiconductor emitting diode is best suited for the purpose since it is shake-proof and small-sized.

The polarizer 3 may be, for example, a dichroic polarization foil converting the light passing therethrough into plane-polarized light. Such a polarization foil is customarily referred to as polaroid. The analyzer 7 is analogous to the polarizer 3. The polarization plane (shown in FIG. 2 as a two-way arrow) of the polarizer 3 and the analyzer 7 makes an angle of +45° with the direction of the maximum stress in the elastic element 6. The stress in the illuminated zone may be assumed to be homogeneous and uniaxial and, consequently, to maximum normal stress is parallel to the force N and the planes of polarization of the polarizer 3 and the analyzer 7 are tilted at an angle of 45° to the direction of said force N resulting from the conversion of the measurand. The planes of polarization of the polarizer 3 and analyzer 7 run parallel to each other.

The phase-shifting plates 4 and 5 are made from a birefringent material, e.g. mica. They serve to produce the initial phase difference ensuring maximum linearity and sensitivity of the piezooptical transducer.

The phase-shifting plates 4 and 5 are characterized by a phase difference $\alpha_o$ produced thereby and a maximum velocity axis F and a minimum velocity axis S, their directions being indicated by arrows in the drawing. The direction of the electric vector of electromagnetic wave with a maximum velocity of propagation in said plate is referred to as the maximum velocity axis F. Similarly, the direction of the electric vector of electromagnetic wave with a minimum velocity of propagation in said plate is identified as the minimum velocity axis S. The axes F and S of the same plate are perpendicular to each other. The phase-shifting plates 4 and 5 are disposed so that the maximum velocity axis F of the plate 4 is perpendicular to that of the plate 5.

This enables the changes in the luminous fluxes A and B, with the measurand (or the force N) applied to the elastic element, to be equal to magnitude but opposite in sign, and makes it possible to employ the difference of the luminous fluxes A and B incident upon the photocell 8, as an output signal of the proposed piezooptical transducer.

A silicon photodiode is used as the photocell 8 and an automatic recorder (or trace recorder) as the recording instrument II.

A square-pulse generator 12 (FIG. 3) is a balanced multivibrator with transistors 16 and 17. The duration of the pulses produced by the generator 12 is determined by resistors 18 and 19 and capacitors 20 and 21. Diodes 22 and 23 are introduced to trim the length of the pulse edges. Resistors 24 and 25 provide for abias to the diodes 22 and 23. Collector resistors 26 and 27 are coupled to the bases of emitter followers using transistors 28 and 29 serving for better matching of the multivibrator with the load circuits connected to emitter resistors 30 and 31. A stable voltage $U_I$ is fed to the square-pulse generator 12.

Another embodiment of a piezooptical measuring transducer may be successfully used, in accordance with the invention, to reduce temperature and time zero drifts and sensitivity.

In this case, the transducer comprises a reference photocell 32 (FIG. 4) disposed immediately behind the elastic element 6 (FIG. 5) across the luminous fluxes A and B and in their field so that said luminous fluxes are incident thereupon and at the same time, upon the photocell 8.

This embodiment of the transducer also comprises a phase-sensitive amplifier 33 (FIG. 4), one of its inputs being connnected to the reference photocell 32 through a separating capacitor 34 and the other, to one of the outputs of the square-pulse generator 12, and two individual current regulators 35 and 36 of each light source I and 2, one input of each regulator being connected to the output of the phase-sensitive amplifier 33 and the other input of each regulator being connected to the second output of the square-pulse generator, whereas the output of each regulator 35 and 36 is coupled, respectively, to the light sources I and 2.

Figure 4:
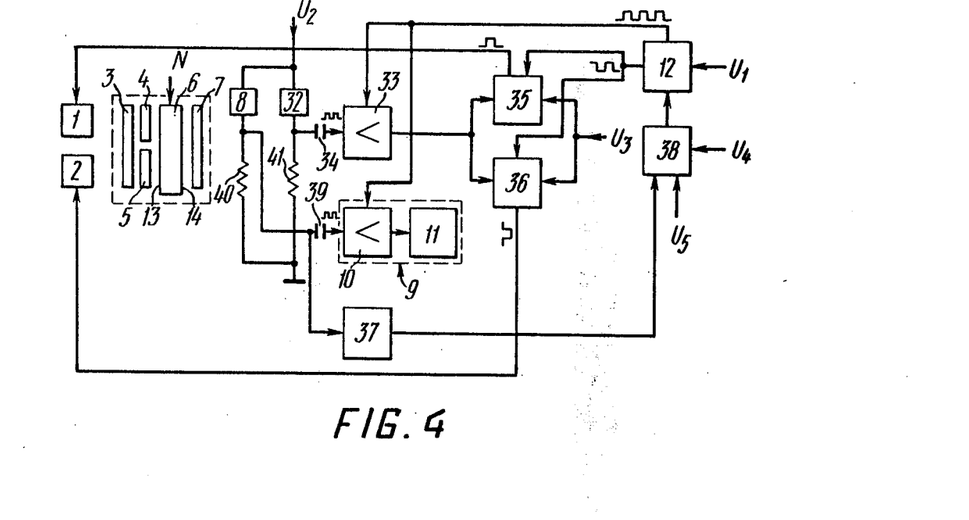
FIG. 4 is a functional diagram of another embodiment of the piezooptical measuring transducer in accordance with the invention.

Besides, the transducer of FIG. 4 comprises a low-frequency filter 37 coupled to the photocell 8 and a general current regulator 38 of both light sources I and 2, one of its inputs being connected to the low-frequency filter 37 and the output being connected to the input of the square-pulse generator.

The photocell 8 of the transducer embodiment in question is connected to one of the inputs of the phase-sensitive amplifier 10 of the recorder 9 through a capacitor 39. The other input of the phase-sensitive amplifier 10 is connected to the first output of the square-pulse generator.

Resistors 40 and 41 are the load of the photocells 8 and 32, respectively.

The photocells 8 and 32 operate as diodes, a supply voltage, $U_2$ being fed thereto. Stable voltages $U_3$ and $U_4$ are respectively supplied to current regulators 35, 36 and 38.

Figure 6:
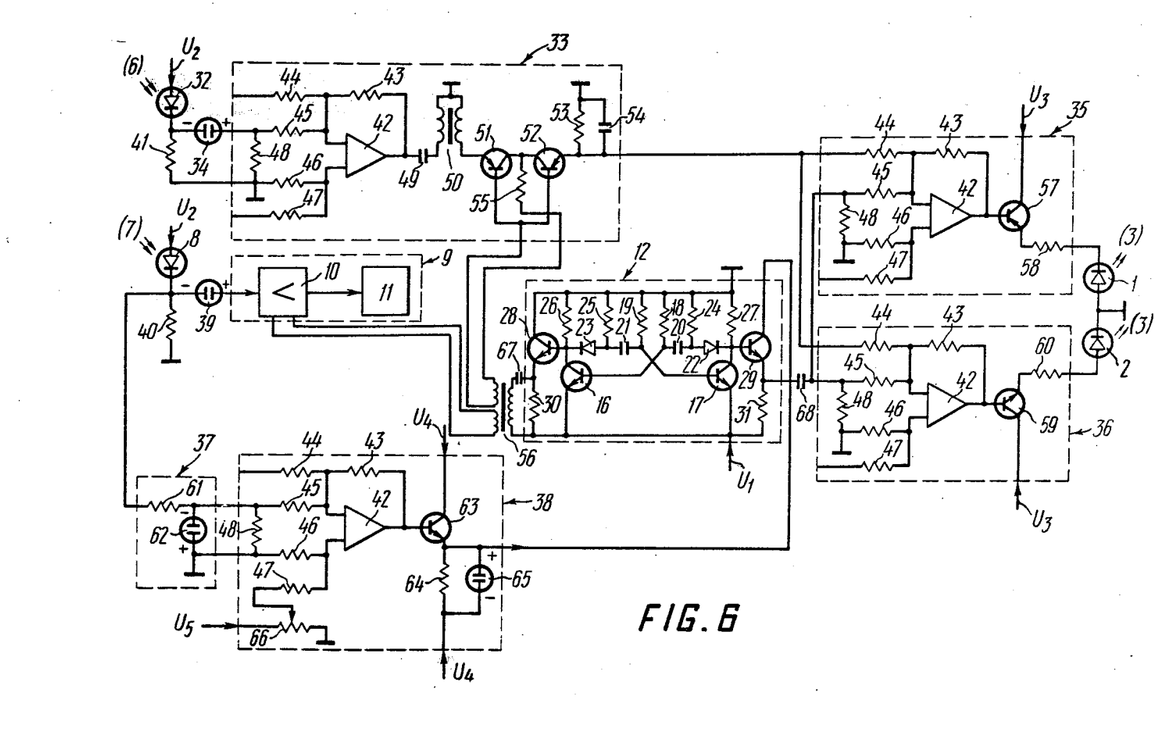
FIG. 6 is an electric circuit diagram of the transducer of FIG. 4.

A silicon photodiode is employed in the described embodiment as the reference photocell 32 (FIG. 6).

The phase-sensitive amplifier 33 contains an operational amplifier 42. A resistor 43 makes up the feedback circuit of the operational amplifier 42. Resistors 44, 45, 46, 47 and 48 serve to match the input circuits of the operation amplifier 42. The output of the operation amplifier 42 is supplied through a separating resistor 49 to a half-wave demodulator comprising a transformer 50 and transistors 51 and 52. A resistor 53 is the load of the demodulator. A resistor 54 serves as a filter. The reference voltage is supplied to the demodulator from the square-pulse generator 12 through a resistor 55 from the secondary winding of a transformer 56. The output of the demodulator is connected to the inputs of the current regulators 35 and 36 of each light source I and 2.

The individual current regulator 35 of the light source I comprises the operational amplifier 42 with the resistors 43 to 47, made similar to that in the phase-sensitive amplifier 33, and a current amplifier with a transistor 57. A resistor 58 serves to limit the current flowing through the light source I.

The individual current regulator 36 of the light source 2 is identical to the individual current regulator 35 with the difference that a transistor 59 of the current amplifier has a different conductivity. The function of a resistor 60 is similar to that of the resistor 58, that is to limit the current passing through the light source 2. The inputs of both current regulators are connected to the output of the phase-sensitive amplifier 33, the light source I and 2 being their respective loads.

The low-frequency filter 37 is an RC circuit comprising a resistor 61 and a resistor 62. The input of the low-frequency filter 37 is connected to the photocell 8 and its output to the common current regulator 38 of both light source I and 2. The common current regulator 38 of the light sources I and 2 comprises the operational amplifier 42 with resistors 43 to 47, made identical to that in the phase-sensitive amplifier 33, and a current amplifier with a transistor 63, a resistor 64 being its load. A resistor 65 serves as a filter. One input of the operational amplifier 42 is connected to the low-frequency filter 37 and the other is supplied with a reference voltage $U_5$. A resistor 66 serves for smooth adjustment of the reference voltage $U_5$ supplied to the input of the operational amplifier 42. The output of the general current regulator 38 of the light sources I and 2 is connected to the square-pulse generator 12.

In this embodiment, the primary winding of the transformer 56 is coupled to the transistor 28 of the generator 12 through a resistor 67, and the output of the transistor 29 is coupled to the inputs of the current regulators 35 and 36 through a separating resistor 68.

The phase-sensitive amplifier 10 of the recorder 9 of FIG. I as well as of FIG. 6 is identical to the phase-sensitive amplifier 33 of FIG. 6.

The operating principle of the proposed piezooptical measuring transducer is based on the photoelasticity effect consisting in appearance of optical anisotropy in initially isotropic media or in variation of optical anisotropy in anisotropic media, in crystals, for example, under the influence of mechanical stresses created in the medium by external forces, for example. Optical anisotropy appearing therein or its variations are proportional to the mechanical stress in the medium.

Optical anisotropy in a specific case, used in the piezooptical measuring transducer, is manifested in terms of two refractive indices $n_X$ and $n_y$ present in the medium, wherein the refraction is in two mutually perpendicular directions parallel to the directions of the main mechanical stresses $\sigma_1$ and $\sigma_2$, the medium being in a plane-stress state. In such media, a light beam is split into two polarized beams, referred to as "ordinary"and "extraordinary" beams, their polarization planes coinciding with the direction of the main mechanical stresses $\sigma_1$ and $\sigma_2$.

A variation in optical anisotropy manifests itself as a change of the difference of the refractive indices $n_x$ and $n_y$ and, consequently, a change in the velocity difference of the wave fronts of the "ordinary" and "extraordinary" beams, resulting in appearance or variation of their phase difference as they leave the medium. (cf. I.

Frocht M.M. "Photoelasticity,"New York, 1941; 2. William A. Shurkliff "Polarized Light. Production and Use", Harvard University Press, Massachusetts, 1962)

A piezooptical measuring transducer in accordance with the invention operates as follows.

Figure 7A:
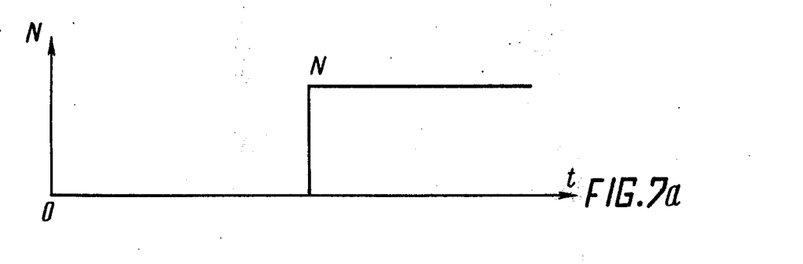

In the absence of a measurand, that is when the force N=0, see FIG. 7a, wherenthe abscissa istime ($t$) and the axis of ordinates is force (N). The light sources I and 2 (FIG. I) emit alternately, being connected to different outputs of the square-pulse generator 12, luminous fluxes A and B, (see FIG. 7b, wherein the abscissa is time ($t$) and the axis of ordinates is the intensity (F) of the luminous fluxes A and B).

The luminous flux A (FIG. I) from the light source I passes through the polarizer 3 and becomes linear-polarized. This luminous flux is split into two beams with perpendicular polarization planes "ordinary" and "extraordinary" beams) in the phase-shifting plate 4, its thickness being selected such as to make the phase difference $\alpha_0$ of these beams equal to $\pi/2$ or $\lambda/4$, where $\lambda$ is the light wavelength.

Then, the luminous flux A passes through the elastic element 6 wherein the it undergoes no changes because the force N=0. Having passed through the analyzer 7 the "ordinary" and "extraordinary" beams interfere, and a luminous flux of a definite intensity ($F_o$ in FIG. 7b) is incident consequently upon the photocell 8. The luminous flux B from the light source 3 (FIG. I passes through the polarizer 3 and phase-shifting plate 5 creating, similarly to the plate 4, the phase difference $\alpha_o$ of the "ordinary" and "extraodinary" beams, equal to $\pi/2$ rad or $\lambda/4$. In the absence of mechanical stresses in the elastic element 6, the magnitude of the luminous flux B incident upon the photocell 8 is equal to $F_o$ (FIG 7b).

The appearance of a measurand originates the force N (FIG. I). Mechanical stresses appear in the elastic element 6. The stressed stat of the elastic element 6 during compression-extension may be considered with a high degree of approximation to be a plane-stress state. That is why the direction of the maximum stresses $\sigma_1$ coincide with the direction of the force N and stress $\sigma_2 = 0$.

Figure 7B:
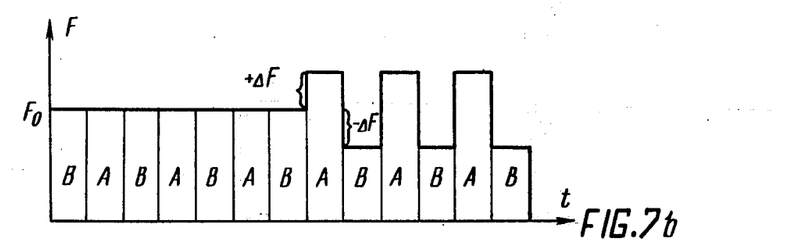

The maximum velocity axis F of the phase-shifting plate 4 being coincident with the direction of the maximum mechanical stress $\sigma_1$ and the axis F of the phase-shifting plate 5 being perpendicular to the direction of $\sigma_1$, the phase difference $\alpha_0$ created by the phase-shifting plate 4, when the luminous flux A passes through the elastic element 6, is increased by a certain phase difference $\Delta\alpha$ originating in the elastic element 6 and the phase difference $\alpha_0$ created by the plate 5 is decreased by the equal difference $\Delta\alpha$ The luminous flux A from the light source I, after having passed through the analyzer 7 and as a result of interference of the "ordinary" and "extraordinary" beams is consequently increased by $\Delta^{+F}$ (FIG.7b) whereas the luminous flux B from the light source 2 (FIG. I) is increased by $-\Delta^F$ (FIG. 7b). The total luminous flux incident upon the photocell 8 (FIG. I) varies with time and and alternating component of the signal originates at the output of the photocell 8. This component is registered by the instrument II after being amplified and demodulated by the phase-sensitive amplifier 10. The alternating component is proportional to the force N applied to the elastic element 6 of the piezooptical transducer.

The piezooptical transducer of FIG. 4, unlike the transducer of FIG. I, has the light sources I and 2 connected to the square-pulse generator 12 through individual current regulators 35 and 36 (FIG. 6).

The square pulses from the output transistor 29 (FIG. 6) of the generator 12 are applied to the inputs of both indiual current regulators 35 and 36 through the separating resistor 68.

The operational amplifiers 42 are used in the current regulators 35 and 36 as a follower, that is as a current amplifier (their voltage amplification factor being equal to one).

The square pulses from the amplifiers 42 are fed to the transistors 57 of the regulator 35 and transistors 59 of the regulator 36. These transistors serve to match the output resistance of the amplifiers 42 with the low resistance of the light sources I and 2. Square pulses of the same polarity are delivered to the bases of the transistors 57 and 59 at the same moment, but, the transistors being selected to have opposite conductance, one of them is rendered non-conductiny by the pulse and the other is thrown into conduction thereby. Alternative operation of the light sources I and 2 is thus ensured.

Figures 3, 5:
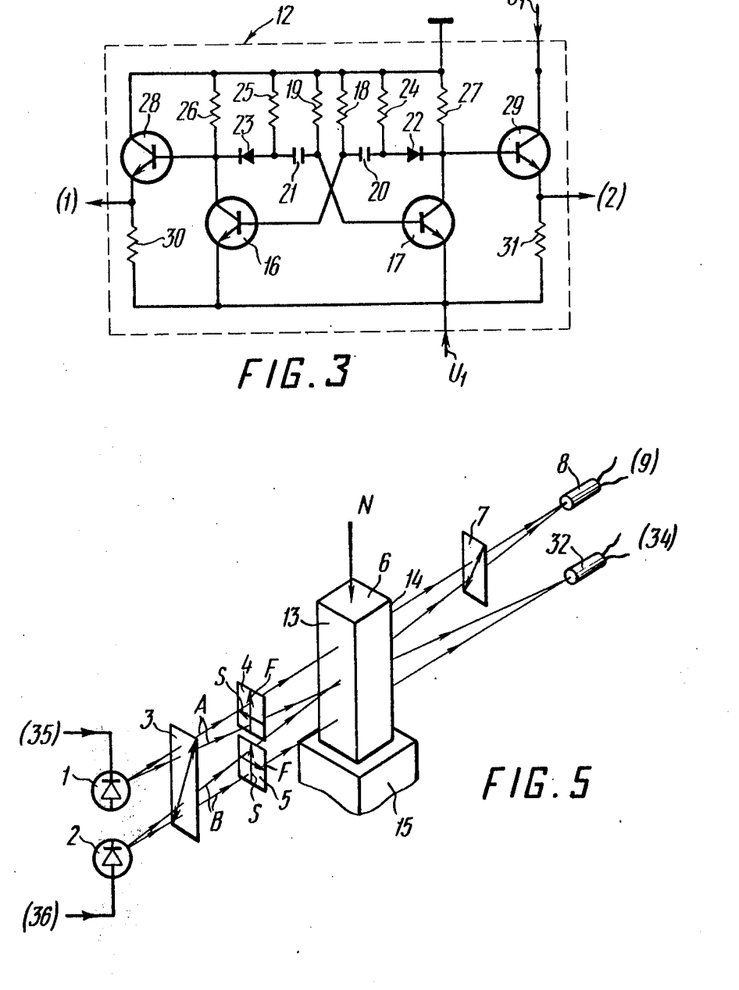
FIG. 3 is an electric circuit diagram of the square-pulse generator of the transducer of FIG. I.
FIG. 5 is an optical circuit diagram of the transducer of FIG. 4.

The temperature and time zero drift caused by instability of the light sources I and 2 is balanced by introduction of the additional photocell 32. This photocell is disposed in the field of the luminous fluxes from the light sources I and 2 so that these fluxes are incident upon the photocell 32 bypassing the analyzer 7, as shown in FIG. 5. The photocell 32 being positioned in this way, the luminous fluxes delivered thereto from the light sources I and 2 are not modulated by the measurand in the polarization optical system comprising the components 3, 4, 5, 6 and 7 and depend upon the radiating capacity of the light sources I and 2 only.

The signal from the photocell 32 (FIG. 6) is amplified by the operational amplifier 42 of the phase-sensitive amplifier 33. the amplification factor of the amplifier 42 is determined by the resistors 43 and 45. After amplification the signal from the photocell 32 is rectified by the half-wave demodulator using two transistors 51 and 52. The reference voltage is supplied to the demodulator from the generator 12 of the secondary winding of the transformer 56. The rectified signal is delivered to the inputs of individual current regulators 35 and 36 of the light sources I and 2, regulating the current of the light sources I and 2 in accordance with the phase of the signal fed from the demodulator.

Figure 8A:
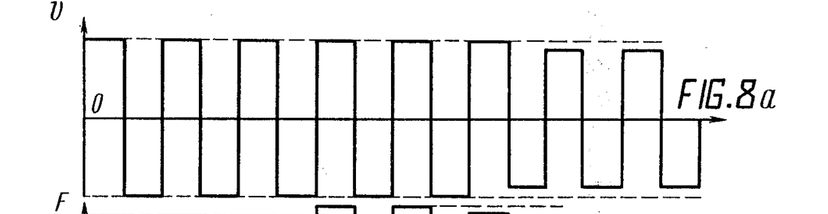
Figures 8B, 8C:
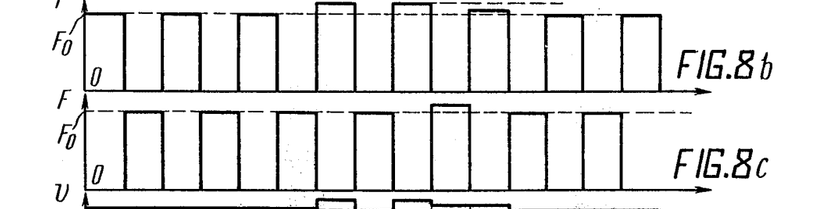
Figures 8D, 8E, 8F:
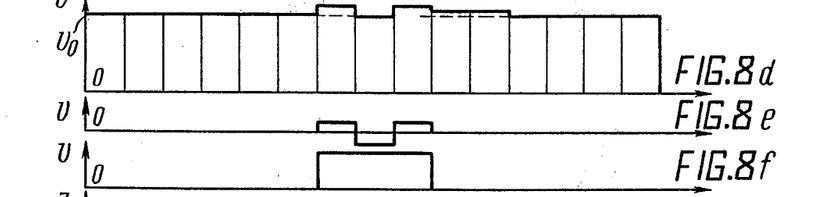
Figure 8G:
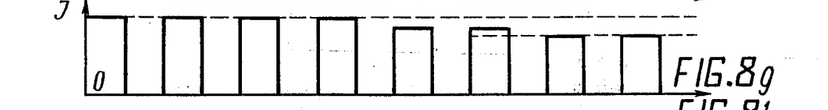
Figures 8H, 8I:
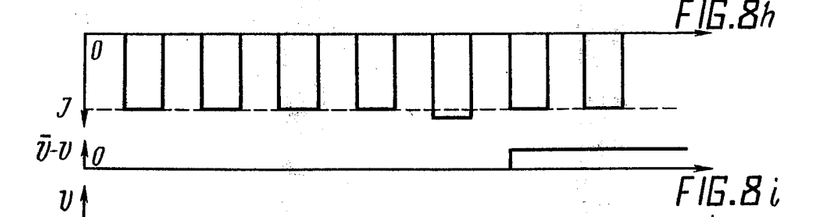
Figure 8J:
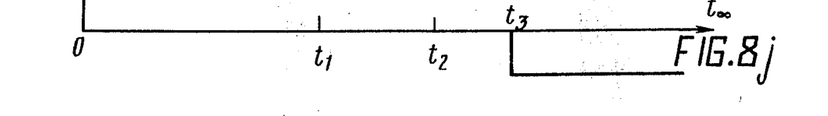

FIG. 8 shows time charts of the transducer of the units of FIG. 4;

a. the output signal of the square-pulse generator 12 and one of the input signals of each of the current regulators 35 and 36;

b. the luminous flux of the light source I.

c. the luminous flux of the light source 2;

d. the output signal of the photocells 32 and 8;

e. the input signal of the phase-sensitive amplifier 33;

f. the output signal of the phase-sensitive amplifier 33 and the second input signal of the current regulators 35 and 36;

g. the current of the light source I and the output of the current regulator 35;

h. the current of the light source 2 and the output of the current regulator 36;

i. the output signal of the low-frequency filter 37 and the input signal of the general regulator 38;

j. the output signal of the general current regulator 38 and the collector voltage of the transistor 29 of the generator 12;

wherein the axis of ordinates in a, d, e, f, i, j is voltage (U), in b and c it is the luminous flux (F) and in g and h it is the current intensity (J).

The radiating capacity of the light sources I and 2 (FIG. 6) being equal, the luminous fluxes incident from each of the light sources I and 2 upon the photocells 32 and 8 are alike and no alternating component is present at the outputs of these photocells 32 and 8, the direct component being equal to $U_o$ (the portion O-$t_1$ in FIG. 8D) and the output signal of the recorder 9 being zero.

Let the light source I (FIG. 6) increase its radiation power (due to a temperature variation or under the influence of time) and the radiation capacity of the light source 2 remain as it is (the portion $t_1$ - $t_2$ in FIGS. 8b,c). An alternating signal appears then at the output of the photocells 32 and 8 (FIG. 8d) and the output signal of the recorder 9 becomes other than zero, and, in the absence of the measurand (the force N=0) this signal is the zero drift of the transducer. To compensate for this zero drift, the signal of the photocell 8 is amplified and demodulated by the phase-sensitive amplifier 33 (FIGS. 6 and 8 e,f) and delivered to the individual current regulators 35 and 36 (FIG. 6) of the light source I and 2. The regulator 35 reduces the current of the light source I, while the regulator 36 increases the current of the light source 2 (FIG. 8 g,h) to equalize the luminous fluxes of the light sources I and 2. The fluxes being made equal (the portion $t_2$ - $t_3$ in the FIG. 8 g,h) the alternating component at the output of the photocells 32 and 8 is absent and the level of the direct component of the output signal of the photocell 32 is somewhat increased and becomes different from the initial level $U_o$ (FIG. 8d).

The luminous fluxes of the light sources I and 2 (FIG. 6) are applied to the photocells 32 and 8 synchronously, that is they similarly vary with time, and in the absence of an alternating signal in the photocell 32 such a signal is also absent in the photocell 8, since it is the alternating component of the signal of the photocell 8 that carries information about the measurand and the absence of such a component corresponds to the zero level of the transducer.

Thus, the zero drift of the proposed piezooptical transducer may be considerably reduced by introduction of the differential feedback (separate for each light source I and 2).

The sensitivity of the piezooptical transducer is proportional to the luminous flux, and the current of the photocell being proportional to the supplied luminous flux, the sensitivity index of the piezooptical transducer may be kept stable by maintaining the value of $U_o$ of the photocell 8 (FIG. 8d) constant.

The transducer is accordance with the invention comprises a sensitivity stabilization circuit. This circuit is made up of the low-frequency filter 37 and the common current regulator 38.

This circuit operates as follows.

The low-frequency filter 37, an RC circuit in this case, separates the mean value U from the output signal of the photocell 8, then the signal is fed to the common current regulator 38 of both light sources I and 2. The reference DC voltage $U_5$ is applied to the other input of the regulator 38. The mean value of the signal delivered from the photocell 8 is compared in the regulator 38 with the value of the reference signal $U_5$ and depending on the sign of the mismatch signal (U - $U_5$) the regulator 38 increases or decreases the supply voltage of the output transistor 29 of the square-pulse generator 12. This transistor 29 operates as a switch and the level of its collector supply determines the value of the signal fed to the inputs of the current regulators 35 and 36, in turn controlling the currents flowing through the light sources I and 2.

Consider now the operation of the sensitivity stabilized transducer after the instant $t_3$ (FIG. 8). As indicated above, the means level of the output signal of the photocell 8 (FIG. 6) becomes somewhat higher than the initial level $U_o$ after the light source I (FIG. 6) changes its radiation power and the luminous fluxes of the light sources I and 2 (FIG. 8 d) are equalized. Different signals are applied to the inputs of the operational amplifier 42 of the regulator 38, the reference voltage $U_5$ being still applied to one input and the other being fed the mean voltage $\overline{U}$ from the photocell 8 which is a little higher than $U_o$. The difference between these voltages $\overline{U}$ - $U_5$ (FIG. 8 i) is amplified by the amplifier 42 (FIG. 8 j) and delivered to the transistor 63 decreasing the collector voltage of the output transistor 29 of the generator 12. The output signal of the generator 12 decreases (the portion $t_3$ - $t$ in FIG. 8 a).

The signal of the generator 12 (FIG. 6) to the individual current regulators 35 and 36 is fed through the separating resistor 68 and becomes bipolar thereafter (FIG. 8 a). The positive half-period of this signal renders the transistor 59 conducting and the transistor 57 non-conducting, whereas the negative half-period renders the transistor 57 conducting and the transistor 59 non-conducting. These transistors operate as semiswitches, that is they are non-conducting in one half-period and operate at an increased rate in the second half-period. The current of the light sources I and 2 is, therefore determined by the signals of both half-periods, supplied from the square-pulse generator 12. As the signal decreases, in this case, the currents of the light sources are also equally decreased (FIG. 8 g,h). As a result, the luminous fluxes of the light sources I and 2 (FIG. 8 b,c) are also diminished, as is the mean level of the output signal of the photocell 8 (FIG. 8 d) tending to become equal to the reference voltage $U_5$, that is tending to the initial value $U_o$.

The mean value of the signal of the photocell 8 is thus maintained on a permanent level resulting in stabilization of sensitivity of the proposed transducer.

It should be noted that under the influence of the measurand the output signal of the photocell 8 contains an alternating component as does the transducer of FIG. I, its time chart being shown in FIG. 7. In this case, a certain phase difference $\Delta\alpha$ is created in the elastic element 6. This phase difference $\alpha_o$ is added to the phase difference produced by the plate 4 when the light source I operates and subtracted from the phase difference $\alpha_o$ produced by the plate 5 when the light source 2 operates, and the increments of the luminous fluxes of the light sources I and 2 are consequently equal in magnitude but opposite in sign (+$\Delta F$ and −$\Delta F$ in FIG. 7 b), but the mean value of the output signal remains constant under the influence of the measurand and there is no mismatch at the input of the general current regulator 38 (FIG. 6) and, hence, no adjustment.

The proposed piezooptical measuring transducer ensures an approximately tenfold decrease of the zero, drift, stabilization of the sensitivity factor and a substantial drop in the noise level.

What is claimed is:

1. A piezooptical measuring transducer comprising: a square-pulse generator having a first and a second outputs; a first light source connected to the first output of said square-pulse generator and producing a first luminous flux; a second light source connected to the second output of said square-pulse generator and producing a second luminous flux; a polarizer placed immediately after the first and second light sources across said luminous fluxes passing therethrough; an elastic element sensitive to variations of mechanical stresses therein caused by changes in the measurand and having two transparent parallel faces; said elastic element being placed downstream of said polarizer across said first and second luminous fluxes passing through said faces; an analyzer placed downstream of said elastic element across said first and second luminous fluxes passing therethrough; a first phase-shifting plate arranged between said polarizer and analyzer, only said first luminous flux passing therethrough; a second phase-shifting plate also arranged between said polarizer and analyzer and oriented in relation to the first phase-shifting plate so that its axis of maximum velocity of light propagation is perpendicular to that of the first phaseshifting plate, only said second luminous flux passing therethrough; a photocell placed downstream of said analyzer across said first and second luminous fluxes, said first and second luminous fluxes being incident thereupon; said first and second light sources being connected to said first and second outputs of said square-pulse generator so that said photocell receives alternately either first luminous flux having passed through said polarizer, first phase-shifting plate, elastic element, and analyzer, or the second luminous flux having passed through said polarizer, second phase-shifting plate, elastic element, and analyzer; said photocell converting said first and second luminous fluxes incident thereupon into an electric signal; a recorder coupled to said photocell and receiving said electric signal, its readings being representative of the measurand.

2. A piezooptical measuring transducer comprising; a square-pulse generator having a first and a second outputs; a first current regulator having a first and a second inputs and an output and connected by its first input to the first output of said square-pulse generator; a second current regulator having a first and a second inputs and an output and connected by its first input to the first output of said square-pulse generator; a first light source coupled to said output of said first current regulator and producing a first luminous flux; a second light source coupled to said output of said second current regulator and producing a second luminous flux; a polarizer placed immediately after the first and second light sources across the luminous fluxes passing therethrough; an elastic element sensitive to variations of mechanical stresses therein caused by changes in the measurand and having two transparent parallel faces; said elastic element placed downstream of said polarizer across said first and second luminous fluxes passing through said faces; an analyzer placed downstream of said elastic element across said first and second luminous fluxes passing therethrough, a first phase-shifting plate arranged between said polarizer and analyzer, only said first luminous flux passing therethrough; a second phase-shifting plate also arranged between said polarizer and analyzer and oriented in relation to the first phase-shifting plate so that its axis of maximum velocity of light propagation is perpendicular to that of the first phase-shifting plate, only said second luminous flux passing therethrough; a first photocell placed downstream of said analyzer across said first and second luminous fluxes incident thereupon; a reference photocell placed in the field of said luminous fluxes of the first and second light sources so that said fluxes are incident thereupon and, at the same time, upon said first photocell; said first and second light sources connected to said first and second current regulators, being in turn, coupled to the first output of said square-pulse generator, so that said first photocell and reference photocell alternately receive either the first luminous flux having passed through said polarizer, first phase-shifting plate, elastic element, and analyzer, or the second luminous flux having passed through said polarizer, second phase-shifting plate, and elastic element; said first photocell converting said first and second luminous fluxes incident thereupon into an electric signal; a phase-sensitive amplifier having a first and a second inputs and an output; said phase-sensitive amplifier having its first input connected to said reference photocell, the second input connecting to the second output of said square-pulse generator and said output connected to the second inputs of the first and second current regulators; a recorder connected to said first photocell and receiving said electric signal, its readings being representative of the measurand.

3. A piezooptical measuring transducer as claimed in claim 2, comprising: said square-pulse generator having an input; a low-frequency filter having an input and an output and connected by its input to said first photocell; a common current regulator of both said light sources, having an input and an output and connected by its input to said output of said low-frequency filter and by its output to said input of said square-pulse generator.

* * * * *